United States Patent
Symons

(10) Patent No.: US 6,451,153 B1
(45) Date of Patent: Sep. 17, 2002

(54) METHOD OF PREPARING A LIGNOCELLULOSIC MATERIAL FOR THE MANUFACTURE OF A FINISHED PRODUCT

(75) Inventor: Michael Windsor Symons, Monument Park (ZA)

(73) Assignee: Tower Technologies (Proprietary) Limited, Scientia (ZA)

( * ) Notice: Subject to any disclaimer, the term of this patent is extended or adjusted under 35 U.S.C. 154(b) by 1215 days.

(21) Appl. No.: 08/849,008

(22) PCT Filed: Oct. 31, 1995

(86) PCT No.: PCT/GB95/02548

§ 371 (c)(1),
(2), (4) Date: Jul. 16, 1997

(87) PCT Pub. No.: WO96/13551

PCT Pub. Date: May 9, 1996

(30) Foreign Application Priority Data

| Oct. 31, 1994 | (ZA) | 94/8554 |
| Nov. 10, 1994 | (ZA) | 94/8917 |
| Dec. 13, 1994 | (ZA) | 94/9910 |
| Apr. 7, 1995 | (ZA) | 95/2890 |
| Aug. 10, 1995 | (ZA) | 95/6664 |

(51) Int. Cl.$^7$ .............................. B32B 31/00
(52) U.S. Cl. ............... 156/276; 156/281; 156/316; 427/214; 427/325; 427/399; 428/326; 428/420
(58) Field of Search ................ 156/316, 276, 156/281; 427/214, 325, 399; 428/326, 420

(56) References Cited

U.S. PATENT DOCUMENTS

| 3,447,996 | A | * | 6/1969 | Himmelheber et al. | ..... 264/113 |
| 3,900,685 | A | * | 8/1975 | Gaylord | ..... 428/420 |
| 3,956,230 | A | * | 5/1976 | Gaylord | ..... 427/214 |
| 5,209,886 | A | * | 5/1993 | Simons | ..... 427/214 |
| 5,385,754 | A | * | 1/1995 | Earl et al. | |

* cited by examiner

Primary Examiner—John J. Gallagher
(74) Attorney, Agent, or Firm—Pillsbury Winthrop LLP

(57) ABSTRACT

A method of preparing particles of a lignocellulosic material for the manufacture of a finished product, such as a particle board, includes the steps of chemically modifying the lignocellulosic material by impregnating the lignocellulosic material with a suitable anhydride in a non-aqueous solvent; applying to the particles of lignocellulosic material an adhesion promoter to promote the adherence of a thermoplastic resin to the surfaces of the particles of lignocellulosic material; and applying to the particles a thermoplastic resin in dry powder form, so that after the application of the adhesion promoter, the thermoplastic resin adheres to the surfaces of the particles of lignocellulosic material, the thermoplastic resin having been surfaced modified by irradiation or by fluorination; and removing any solvent present.

22 Claims, No Drawings

METHOD OF PREPARING A LIGNOCELLULOSIC MATERIAL FOR THE MANUFACTURE OF A FINISHED PRODUCT

This application is the national phase of international application PCT/GB95/02548, filed Oct. 31, 1995 which was designated the U.S.

BACKGROUND OF THE INVENTION

This invention relates to a method of preparing particles of a lignocellulosic material for the manufacture of a finished product and to a method of making a finished product from the particles of lignocellulosic material.

It is well known to manufacture particle board and other composites from chips, particles, fibres, veneers, flakes, strands or flours of natural fibrous plant materials such as wood. Such boards are most frequently made by using formaldehyde condensation resins such as urea, melamine or resole phenolics as binders. Polyureas and isocyanates are also used. It is desirable that free formaldehyde or other binder related toxic volatiles should be avoided, that swelling due to water wetting be minimised thereby increasing water resistance, that the binder system used should be water proof, that the surface integrity of the board should be such as to promote ease of finishing, that the strength and consistency of the composite lend itself to thin calliper board production, with strength properties comparable to plywood, and that the process should not be particle size critical as is the case with binder spray-on, followed by shear or "wet wipe" binder distribution. Further desirable properties are good machinability, good nail and screw holding and good edge finishing.

Natural fibrous plant materials or lignocellulosic materials are comprised of hemi celluloses, celluloses and lignin. A change in the moisture content of these materials results in swelling, because the cell wall polymers of the materials contain hydroxyl or other oxygen containing groups that attract water through hydrogen bonding. The hemi celluloses are the most hygroscopic, but lignin also contributes to the hygroscopicity of these materials. It is the moisture that swells the cell walls and causes the expansion of the material until the cell walls are saturated with water. This can obviously give rise to degradation as a result of attack by microorganisms, as well as bulking and dimensional instability. This phenomenon applies not only to lignocellulosic composites such as chipboard, particle board, plywood, strand board, medium density fibre board and hardboard, but also to sawn timber and pulp and paper products.

It is known to modify lignocellulosic materials chemically. The chemicals used are generally classified by the type of bond formed between them and the wood cell wall hydroxyl group. Various classes of chemical reactions have been used with wood and they are esters, acetals, and ethers produced inter alia by the use of anhydrides.

Examples of documents which teach the use of anhydrides include U.S. Pat. Nos. 4,832,987, 5,055,247 and 5,064,592.

Examples of (documents which teach the use of anhydrides to treat a cellulosic material to which there is then applied a polymer, are U.S. Pat. Nos. 5,120,776; 5,385,754 which teaches a process for modifying lignocellulosic material by a chemical treatment method, which method comprises treating the lignocellulosic material with phthalic anhydride and a thermosetting resin selected from phenolformaldehyde resins, urea formaldehyde resins and urethane resins, and then curing the phthalylated resin impregnated product so formed; CA 119:227002; and CA 120:135905.

However, even if a lignocellulosic material is pretreated, conventional composite board production requires that where condensation resins such as ureas, phenols and melamines are used, the lignocellulosic material must be dried thoroughly before the application of the binder, because water is added back to the fibres during resination and it is essential that the hot pressing of the boards proceed without delay in a continuous production process, in order that neither the applied reactive binder resins, nor the lignocellulosic material itself, degrades as a result of extended storage.

There is a need for a composite board technology that allows for the chemical modification and resination of a lignocellulosic material, after which the material is in a dry and latent condition so that it may be stored, without degradation, and transported or made up, at a later time and place into its finished product form.

SUMMARY OF THE INVENTION

According to a first aspect of the invention there is provided a method of preparing particles of a lignocellulosic material for the manufacture of a finished product which method includes the steps of:

(a) chemically modifying the lignocellulosic material by impregnating the lignocellulosic material with an impregnating composition comprising a dicarboxylic anhydride or a tricarboxylic anhydride dissolved in a suitable non-aqueous solvent;

(b) applying to the particles an adhesion promoter to promote the adherence of a thermoplastic resin to the surfaces of the particles of lignocellulosic material;

(c) applying to the particles a thermoplastic resin in dry powder form, so that after the application of the adhesion promoter, the thermoplastic resin adheres to the surfaces of the particles of lignocellulosic material, the thermoplastic resin having been surface modified by irradiation or by fluorination; and (d) after step (a) or step (c), removing the solvent.

Step (c) may precede step (a) or may follow step (a) or step (b).

In a first alternative, the adhesion promoter may be included in the impregnating composition of step (a).

In a second alternative, the adhesion promoter may be applied to the particles after step (a).

For either of these alternatives, the solvent is recovered after step (c).

In a third alternative, the solvent may be recovered after step (a) and thereafter the adhesion promoter may be applied to the particles of lignocellulosic material in a solvent for the adhesion promoter.

In a fourth alternative, the adhesion promoter may be applied to the particles of thermoplastic resin before step (c).

The dicarboxylic anhydride may be selected from the group consisting of maleic anhydride, phthalic anhydride, succinic anhydride and tetrahydrophthalic anhydride, and the tricarboxylic anhydride may be trimellitic anhydride. Suitable solvents include methyl acetate, ethyl acetate, methylethyl ketone, benzene, trichloroethylene and dichloromethane, preferably dichloromethane.

The impregnating composition preferably contains from 0,25% to 25% inclusive, more preferably from 0,25% to 15% inclusive of the anhydride by weight of the impregnating composition.

As the lignocellulosic material preferably takes up from 10% to 120% inclusive, more preferably from 30% to 110% inclusive of the impregnating composition by weight of the lignocellulosic material before removal of the solvent, after removal of the solvent the amount of the anhydride in the lignocellulosic material thus ranges from 0,025% to 30% inclusive by weight of the lignocellulosic material.

The adhesion promoter is preferably selected from the group consisting of convertible resins such as petroleum resins, hydrocarbon resins and coumarone indene resins; thermoplastic rubbers; styrene butadiene resins; styrene acrylate resins; chlorinated rubbers; phenolic resins; solvent soluble thermoplastic resins such as polystyrene or polyvinyl chloride; lignocellulosic derived gums or rosins; solvent swellable celluloses such as methylhydroxypropylcellulose; phenol formaldehyde novolac resins; urethane elastomers; resinous tackifiers; bitumen; coal tar; asphalt and pitch; if necessary dissolved in a suitable non-aqueous solvent such as those listed above for the anhydrides.

In the third alternative, the adhesion promoter may be one used in the water phase, such as those selected from the group comprising water soluble, dispersible or miscible polymers, which are stable to electrolytes with film forming temperatures between minus 15° C. and 40° C., including polyvinyl alcohol, polyurethanes, olefins, acrylate vinyl esters, polyvinyl halides, chloroprene copolymers, and dispersions of styrene butadiene rubber, butadiene vinyl acetate copolymers and polyacrylic acid esters, acrylics and the acrylic pressure sensitives.

The adhesion promoter is preferably applied to the particles in an amount of from 0,1% to 25% inclusive, preferably from 0,25% to 3% inclusive of the adhesion promoter by weight of the particles of lignocellulosic material.

The thermoplastic resin preferably comprises an irradiated cross-linkable thermoplastic resin in dry powder form, preferably finely divided dry powder form, which resin has been subjected to gamma irradiation whilst in dry powder form, the resin being selected from the group consisting of polyvinyl chloride, linear low density polyethylene, low density polyethylene and high density polyethylene, or a thermoplastic resin in dry powder form, preferably finely divided dry powder form, which has been fluorinated, the resin being selected from the group consisting of polyvinyl chloride, polyethylene and polypropylene.

In step (c), the particles of lignocellulosic material are resinated with from 1% to 300% inclusive of the thermoplastic resin by weight of the lignocellulosic material. Where the particles of lignocellulosic material are destined for an extrusion or injection moulding process, then the particles are preferably resinated with from 50% to 300% inclusive of the thermoplastic resin by weight of the lignocellulosic material. However, where the particles are destined for a compression moulding process, e.g. the manufacture of a particle board, then the particles are preferably resinated with from 2% to 50% inclusive of the thermoplastic resin by weight of the lignocellulosic material.

In step (a), the impregnating composition may include an isocyanate thermosetting resin dissolved in a suitable compatible solvent.

The solvent for the isocyanate resin is preferably the same as the solvent for the impregnating composition, but may be a different compatible solvent.

The impregnating composition preferably contains the isocyanate thermosetting resin in an amount of from 0,25% to 50% inclusive of the isocyanate thermosetting resin by weight of the impregnating composition.

In step (c), there may also be applied to the particles a dry powder novolac thermosetting resin and if necessary a catalyst therefor so that the dry powder novolac thermosetting resin adheres to the surfaces of the particles of lignocellulosic material.

In step (c) there may also be applied to the particles, with or without the dry powder novolac thermosetting resin, a wax either in dry particulate form or dissolved in a suitable solvent, so that the wax adheres to or impregnates the surfaces of the particles of lignocellulosic material.

In step (a) there may also be incorporated other additives such as for example a fire retardant or fire inhibitor, a bacteriostat, a fungicide, an insecticide, an ultraviolet stabiliser or absorber, an anti-oxidant, a dye or a scent.

In addition, the particles of lignocellulosic material may be mixed with a suitable amount of cryogenically ground crumb rubber particles, such as those recovered from automobile tires, in the range of particle sizes from 0,25 to 3 mm inclusive, to improve the resilience, shock resistance, nail holding ability and flexibility of the finished product made therefrom.

According to a second aspect of the invention there is provided a process of making an article from particles of a lignocellulosic material treated by steps (a), (b), (c) and (d) above, which process includes the step of:

(1) compressing the particles of lignocellulosic material with heating in a suitable press or mould to allow the resin present to polymerise, and to allow any wax or convertible resin present to melt and to flow and all to set to form the article.

For example, the particles of lignocellulosic material may be compressed and heated in a suitable press or mould at temperatures between 120° C. and 250° C. inclusive, preferably from 130° C. to 220° C. inclusive, and pressures of from 2 to 70 kg/cm$^2$ inclusive.

The article may be for example a particle board.

According to a third aspect of the invention, there is provided a process of making a particle board from particles of a lignocellulosic material treated by steps (a), (b), (c) and (d) above, which process includes the steps of:

(i) impregnating a sheet or sheets of a lignocellulosic material with a composition comprising a thermosetting resin, an extending liquid for the thermosetting resin and where necessary a catalyst for the thermosetting resin;

(ii) recovering the extending liquid;

(iii) placing on one or both sides of a layer of the particles of lignocellulosic material, the impregnated sheet or sheets of lignocellulosic material to form a composite; and (iv) compressing the composite with heating in a suitable press to allow the resin present to polymerise, and to allow any wax or convertible resin present to melt and flow, and to allow the thermosetting resin in the impregnated sheet or sheets to polymerise and to bond, and all to set to form the particle board.

Again, for example, the composite may be compressed and heated in a suitable press at temperatures between 120° C. and 250° C. inclusive, preferably from 130° C. to 220° C. inclusive, and at pressures of from 2 to 70 kg/cm$^2$ inclusive.

According to a fourth aspect of the invention there is provided a process of making an article from particles of a lignocellulosic material treated by steps (a), (b), (c) and (d) above, which process includes the step of:

(I) subjecting the particles of lignocellulosic material to an extrusion or injection moulding process with heating to allow the resin present to polymerise, and to allow any wax or convertible resin present to melt and to flow and all to set to form an article.

DESCRIPTION OF EMBODIMENTS

The first aspect of the invention is a method of preparing particles of a lignocellulosic material for the manufacture of a finished product.

Lignocellulosic material refers to any plant material emanating from the photosynthetic phenomenon.

The particles of a lignocellulosic material may be any particles suitable for the manufacture of a particle board or a medium density fibre board or the like, such as wood chips, particles, strands, flakes, flour, veneer or wood fibres; and particles made from other plant materials such as hemp, sisal, cotton stalk bark, wheat or other cereal straw, bamboo or jute or similar. Suitable sizes for the particles of the lignocellulosic material include particles having a length of from 0,5 to 25 mm inclusive and a diameter of from 0,25 to 3 mm inclusive for the inside of a particle board and smaller particles for use on the outer horizons of the particle board. Where a medium density fibre board is desired the particle size and shape would generally be uniform throughout the thickness of the board but the particle size would be much smaller approaching unifibre size and 1 to 4 mm in length.

In the first aspect of the invention, the lignocellulosic material is chemically modified by impregnating the lignocellulosic material with an impregnating composition comprising a dicarboxylic anhydride such as maleic anhydride, phthalic anhydride, succinic anhydride, or tetrahydrophthalic anhydride, or a tricarboxylic anhydride such as trimellitic anhydride, dissolved in a suitable solvent.

The choice of solvent is dictated by its suitability, including toxicity, ease of handling, boiling point and evaporative rate, which in turn affect its ease of recovery from the lignocellulosic material after impregnation, its inertness and therefore absence of interference chemically, flammability and danger of explosion, its solvency thereby propagating the infusion and intimate wetting of the cellular tissue of the lignocellulosic material, and finally its ease of recovery by absorption in activated carbon followed by steam purging and distillation, or condensation and refrigeration or membrane or sieve technologies. Examples of suitable solvents are methyl acetate, ethyl acetate, methylethyl ketone, benzene, trichloroethylene and dichloromethane. Dichloromethane is the preferred solvent, because it is non flammable, has a boiling point of approximately 39° Centigrade and is relatively inert, and meets the other requirements of the process. In addition dichloromethane has the propensity to absorb water as a solute forming a 98% azeotrope thereby denaturing the lignocellulosic material and further propagating the latency, where present, of the isocyanates which react with hydroxyl containing compounds, notably water, to produce urethanes. The high evaporative rate of dichloromethane also propagates the more rapid evaporation of residual water.

The reaction between the anhydride and the lignocellulosic material at elevated temperatures in the absence of solvents is an esterification reaction yielding, as an example, lignocellulosic maleate or phthalate or succinate with a residue of water. The anhydrides may be represented as follows:

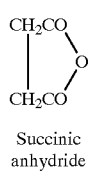
Succinic anhydride

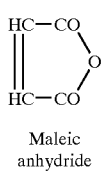
Maleic anhydride

Phthalic anhydride

Other anhydrides such as propionic and butyric anhydride may be esterified to wood or other lignocellulosic material. The result of the reaction is effectively a lignocellulosic polyester, because in the cases of maleic anhydride, phthalic anhydride and succinic anhydride, a polymerisation takes place resulting in binding properties when the impregnated and dried material is subjected to heat and pressure, thereby complimenting the function of the binders used in this invention. In the case of maleic anhydride, the double bond opens allowing cross linking and in the case of phthalic anhydride, the ring opens initially, followed by polymerisation. The use of phthalic anhydride can result in a marked colour change whereas maleic anhydride gives rise to a pleasant woody colour.

A further notable function of the anhydrides is that they scavenge any available hydroxyl groups or water, thereby further promoting the latency of the isocyanates, when present, in the impregnating liquor by preventing the reaction of these isocyanates with hydroxyl groups which would give rise to the formation of urethane polymers, and also denaturing the lignocellulosic material during the impregnation process.

A still further function of the anhydrides is that after contact with the lignocellulosic material and the removal of the solvent, the residual carboxylic acid groups catalyse the polymerisation of the isocyanates, when present.

The impregnating composition may also include a long chain carboxylic acid such as a C10 to C50 monocarboxylic acid, preferably stearic acid, dissolved in a suitable solvent, such as methyl acetate, ethyl acetate, methylethyl ketone, benzene, trichloroethylene and dichloromethane.

A number of carboxylic acids may be esterified to wood or other lignocellulosic materials in the absence of solvents at elevated temperatures. Apart from the esterification potential, the long chain carboxylic acids with a relatively small polar group attached, tend to orientate with the polar group to the hydroxyl groups in the polymers of the lignocellulosic cell walls, with the long carbon chain orientated toward water ingress, thereby imposing hydrophobicity.

The lignocellulosic material may be impregnated with the impregnating composition by immersion, or by spraying, following which the solvent may be recovered for reuse.

Step (a) of the method of the invention is designed to esterify the lignocellulosic material, to impose hydrophobicity upon the lignocellulosic material, and to provide a propensity for cross-linking, polymerisation or coupling synergistically with a binder or resin as will be described below.

Step (b) of the method of the invention is to apply to the particles an adhesion promoter to promote the adherence of a thermoplastic resin to the surfaces of the particles of lignocellulosic material.

In a first alternative, the adhesion promoter may be included in the impregnating composition of step (a).

As a second alternative, the adhesion promoter may be applied to the particles after step (a). In this case, the adhesion promoter may be applied with or without a solvent therefor, and in any suitable manner such as for example by spraying or the like.

For either of these two alternatives, the solvent is recovered after step (c).

As a third alternative, the solvent may be recovered after step (a) and thereafter the adhesion promoter may be applied to the particles of lignocellulosic material in a solvent for the adhesion promoter, again in any suitable manner such as for example by spraying.

As a fourth alternative, the adhesion promoter may be applied to the particles of the thermoplastic resin before step (c), so that the adhesion promoter adheres to the resin particles.

The adhesion promoter is preferably selected from the group consisting of: convertible resins such as petroleum resins, hydrocarbon resins and coumarone indene resins. The petroleum resin, for example, may be derived from cracked oil C9 unsaturated monomers. The hydrocarbon resin may be an alkylated hydrocarbon resin or a hydroxy modified hydrocarbon resin; thermoplastic rubbers, e.g. Kraton D1102CS by Shell;
styrene butadiene resins;
styrene acrylate resins;
chlorinated rubbers;
phenolic resins;
solvent soluble thermoplastic resins such as polystyrene or polyvinyl chloride;
lignocellulosic derived gums or rosins;
solvent swellable celluloses such as methylhydroxypropylcellulose, e.g. Culminal MHPC 2000S by Hercules Corporation;
phenol formaldehyde novolac resins, e.g. Plyophen 602N or Varcum 3337 by PRP Resins Division of Sentrachem Ltd;
bitumen, e.g. hard bitumen Mexphalte H80/90 by Shell, coal tar, asphalt or pitch;
urethane elastomers;
resinous tackifiers, e.g. Oulutac 20GPR by Forchem OY;
if necessary dissolved in a suitable non-aqueous solvent such as those listed for the anhydrides, preferably dichloromethane.

In the third alternative, the adhesion promoter may be one used in the water phase, such as those selected from the group comprising water soluble, dispersible or miscible polymers, which are stable to electrolytes with film forming temperatures between minus 15° C. and 40° C., including polyvinyl alcohol, polyurethanes, olefins, acrylate vinyl esters, polyvinyl halides, chloroprene copolymers, and dispersions of styrene butadiene rubber, butadiene vinyl acetate copolymers and polyacrylic acid esters, acrylics and the acrylic pressure sensitives.

The adhesion promoter is applied to the particles in an amount of from 0,1% to 25% inclusive of the adhesion promoter by weight of the particles of lignocellulosic material.

Step (c) of the method of the invention is to apply to the particle, either before step (a) or after step (a) or step (b), a thermoplastic resin preferably in finely divided dry powder form, so that after the application of the adhesion promoter, the thermoplastic resin adheres to the surfaces of the particles of lignocellulosic material, the thermoplastic resin having been surface modified by irradiation or by fluorination.

Thus the thermoplastic resin may be mixed with the dry particles of lignocellulosic material before application of the anhydride and the adhesion promoter. Then, when the adhesion promoter is applied, the thermoplastic resin adheres to the surfaces of the particles of lignocellulosic material.

Alternatively, the thermoplastic resin may be applied to the particles of lignocellulosic material after application of the anhydride or after application of the adhesion promoter. In either case, when the adhesion promoter is applied, the thermoplastic resin adheres to the surfaces of the particles of lignocellulosic material.

The thermoplastic resin may be an irradiated cross-linkable thermoplastic resin in dry powder form, preferably finely divided dry powder form, which resin has been subjected to gamma irradiation whilst in dry powder form, the resin being selected from the group consisting of polyvinyl chloride, linear low density polyethylene, low density polyethylene and high density polyethylene.

The dry powder thermoplastic resin may, for example, be a polyvinyl chloride, or a linear low density polyethylene, low density polyethylene or a high density polyethylene, which resin has been subjected to gamma irradiation at various absorbed dosages, typically in the range of from 5 to 30 kGy, preferably from 8 to 25 kGy, and preferably in oxygen or in an oxygenated atmosphere, irradiation being carried out at a typical dose rate of 1.38 Gy per second. It is to be noted that excessive dosing can result in the polymer being degraded.

The process of pre-irradiating these feed stock resins in fine particle size in bags is practical and relatively inexpensive. Further, radiation induced chemical changes in the chemical structure of the resins lead to remarkable physical changes in the resins, amongst which are improved cohesive strength and adhesion on conversion, when such radiation induced chemical changes occur before the conversion of the resins. Irradiation has a marked influence on the morphological characteristics of the resulting resins and their associated physical properties when used as binders in lignocellulosic composites. Radiation induced cross-linking takes place predominantly in the amorphous phase of the resins and results in an enhancement of the crystalline content of the final thermoplastic resins and which are induced to behave in a thermosetting manner, through the presence of irradiation induced grafting of reactive groups.

After the dry powder irradiated thermoplastic resin has adhered to the surface of the lignocellulosic material, the solvent for the impregnating composition may be recovered for re-use, or otherwise removed. This leaves the lignocellulosic material with a resinated surface which is dry and effectively in a latent condition, ready for processing to form a finished product.

The level of dry powder resination of the lignocellulosic material is from 1% to 300% inclusive on a weight basis, depending upon the end application of the resulting product, but is more usually in the range of from 2% to 50% inclusive on a weight basis for a compression moulding process, e.g. for composite boards and in the range of from 50% to 300% inclusive on a weight basis for extruded and injection moulded products.

In addition, these irradiated thermoplastic resins in finely divided dry powder form may be ground with pigments and suitable extenders such as carbonates, talcs or kaolins, and laid up as a dry outer horizon or as a pre-pigmented film on one or both outer surfaces of a lignocellulosic composite core during the manufacture of a board, so providing for decorative surfaces.

The thermoplastic resin may also be a thermoplastic resin in dry powder form, preferably in finely divided dry powder form, which has been fluorinated, the resin being selected from the group consisting of polyvinylchloride, polyethylene and polypropylene.

The resin in finely divided powder form or in very high aspect ratio fibre form, or in thin flake form, is treated with fluorine gas, which because it is such a strong oxidising agent may be diluted with another gas up to 99% by volume. The resin particles may be first subjected to a vacuum before the introduction of the fluorine gas which may be diluted with nitrogen or oxygen or other gas, and under pressure. After sufficient period of contact the fluorine is once again removed and purged by vacuum in order to reduce the free fluorine level to the order of 0,1 parts per million in the entrained air, or lower.

The thermoplastic resin is selected from the group consisting of polyvinyl chloride, polyethylene or polypropylene, polypropylene being the preferable polymer, which has been fluorinated and which adheres to the surface of the lignocellulosic material.

Fluorination induced chemical changes in the chemical structure of the resins leads to physical changes in the resins, amongst which are improved cohesive strength and adhesion on conversion when such fluorination induced chemical changes occur before the conversion of the resin. Fluorination has an influence on the morphological characteristics of the resins and their associated physical properties when used as binders in lignocellulosic composites in which they may be induced to behave in a thermosetting rather than a purely thermoplastic manner, through the presence of fluorination induced grafting of reactive groups.

After the dry powder, fibre or flake of fluorinated thermoplastic resin has adhered to the surface of the lignocellulosic material, the solvent for the impregnating composition may be recovered for re-use or otherwise removed. This leaves the lignocellulosic material with a resinated surface which is dry and which is effectively in a latent condition, because the activation of the fluorinated binder resin is only achieved on subjection to the necessary conditions of temperature and pressure as is described hereinafter.

The level of resination of the lignocellulosic material is from 1% to 300% inclusive on a weight basis depending upon the end application of the resulting product, but is more usually in the range of from 2 to 50% inclusive on a weight basis for a compression moulding process, e.g. for composite boards and in the range of from 50% to 300% inclusive on a weight basis for extruded and injection moulded products.

In addition, these fluorinated thermoplastic resins in finely divided dry powder or flake or fibre form, or in film form may be pre-pigmented for laying up as a dry outer horizon or as a pre-pigmented film on one or both outer surfaces of the lignocellulosic composite core, during the manufacture of a board, so providing for decorative surfaces. In addition outer laminating films may be used which in themselves are laminates, the inner laminate only having been fluorinated.

The resination of the particles is designed to bind the particles to one another to form a composite product or an extruded product or the like.

In step (a) the impregnating composition may include an isocyanate thermosetting resin dissolved in a suitable compatible solvent.

Isocyanates are compounds containing the group— N=C=O and are characterised by the general formula:

$$R(NCO)_x.$$

wherein x is variable and denotes the number of NCO groups and R denotes a prepolymer group.

Examples of these isocyanates are those containing an (NCO) content percentage preferably exceeding 20%, more preferably exceeding 30%. These isocyanates promote latency or reduced reactivity and provide the maximum capacity for hydroxyl bonding. Examples are Desmadur VKS or Desmadur VK by Bayer, which are solvent free mixtures of aromatic polyisocyanates such as diphenyl methane-4,4 di-isocyanate and polymeric matter. These and similar are typically referred to as MDIs in the industry. A further description used is a di-isocyanato-diphenyl methane, further examples being Suprasec DNR-5005, which is a polymeric MDI, or Suprasec 2020 which is a monomeric MDI with available NCO percentages of 30,7% and 29% and which are polymeric MDI with standard functionality and monomeric MDI respectively. The Suprasec resins are supplied by ICI. A further example of a crude MDI is Voronate M 229 by Dow Chemical Company.

Further suitable di-isocyanates are the toluene di-isocyanates with the alternative names tolylene di-isocyanate or toluylene di-isocyanate with the abbreviation TDI, such as Desmadur L75 by Bayer.

A further example of the principle of wood esterification is the use of ethyl isocyanate which reacts with hydroxyl groups to form ethyl carbamate (urethane) according to the formula:

$$C_2H_5NCO+H_2O \rightarrow NH_2COOC_2H_5$$

The isocyanate resins are fully soluble in dichloromethane and react with the hydroxyl groups on the cellulose and hemi cellulose molecules of the lignocellulosic material to form a wood ester. In this way they form a chemical bond adhesion rather than a cohesive adhesion. They are therefore effective in contributing not only to a reduction in water sensitivity but also to superior binding. In addition, they scavenge any carboxyl groups which are residual from the carboxylic acid derived from the anhydride, and also. link with the hydroxyl group on the phenol molecule that may be residual when a novolac resin is used, or with the hydroxyl or other grafted groups on irradiated polyethylene molecules when irradiated polyethylenes are used, particularly those irradiated in the presence of oxygen which propagates the formation of hydroxyl groups or similar reactive groups that may be grafted by the fluorination of polypropylene or polyethylene. The isocyanate resins lend themselves to synergistic binding of composites and to the propagation of superior mechanical properties by a three cornered linkage with the residue of the anhydrides, the hydroxyl groups on the lignocellulosic material itself and with synergistic binders such as the novolacs or irradiated polyethylenes or others that contain groups such as hydroxyl or carboxyl that react with the NCO groups of the isocyanates.

The solvent may be any suitable solvent and is preferably dichloromethane, the isocyanate thermosetting resin being dissolved in the dichloromethane at a concentration of from 0,25% to 50% by weight, more preferably at a concentration of from 1 to 10% by weight of the impregnating composition.

After the treatment of the lignocellulosic material with the isocyanate thermosetting resin in the solvent, the solvent is recovered for reuse. The isocyanate thermosetting resin is left on and in the lignocellulosic material in a latent condition ready for subsequent polymerisation when subjected to the appropriate conditions of heat and pressure.

In step (c), there may also be applied to the particles a dry powder novolac thermosetting resin and if necessary a catalyst therefor so that the dry powder novolac thermosetting resin adheres to the surfaces of the particles of lignocellulosic material.

A novolac resin is a resin based upon phenol and formaldehyde and any of the variations and modified forms of such a resin, where the molar ratio of phenol to formaldehyde exceeds parity. The novolac resin may contain a catalyst, which on decomposition with heat gives rise to a source of formaldehyde, inducing the condensation of the polymer to form a three dimensional stable network with minimal shrinkage and which is hard, strong and insoluble. The resin is used in finely divided powder form and has the property of commencing to flow at approximately 100 to 130° C., generally around 110° C., followed by the decomposition of the catalyst, for example, hexamethylene tetramine. Example of suitable novolac resins are Schenectady Corporation of South Africa codes 6240 or 3174, or Plyophen 24-700 and Plyophen 602N or Varcum 3337 of PRP Resins Division of Sentrachem Ltd of South Africa.

After the dry powder novolac thermosetting resin has adhered to the surface of the lignocellulosic material, the solvent from the impregnating composition may be recovered for reuse or otherwise removed. This leaves the lignocellulosic material with a resinated surface which is dry and in a latent condition, ready for processing to form a finished product.

In step (c) there may also be applied to the particles with or without the novolac resin, a wax either in dry particulate form or dissolved in a suitable solvent so that the wax adheres to or impregnates the surfaces of the particles of lignocellulosic material Examples of suitable waxes are code C15 by Sasol Limited South Africa, with the congealing point of 102° C., or spray Wax 405F or 105F, having drop melting points greater than 115° C., congealing points of 104° C. and a penetrating index at 25° C. of 1 maximum, a bromine value of 0,1 and a particle size of from 10 microns and an average molecular mass of 700 to 1300. The wax is added typically at the rate of from 0,5 to 10% of the mass of the lignocellulosic material treated, more typically in the range of from 2 to 8%. The preferred waxes are aliphatic, highly crystalline, i.e. 85%+, linear and non branched, with the lower molecular weights being preferred, subject to a melt point being above 85° C. and with an absence of amorphous zones.

When the lignocellulosic material so treated with wax and binder and from which the solvent has been removed, is subsequently pressed at temperatures in excess of 140° C., usually between 140 and 250° C. and at pressures of from 2 to 70 kg/cm$^2$, the wax melts to give a very low viscosity liquid, i.e. 8 centipoise, and diffuses or migrates through the lignocellulosic material, imposing upon it waterproofness, excellent machining properties, and good surface finishes. The wax does not interfere with the subsequent application of either liquid coatings or laminates.

In step (a) there may also be incorporated other additives such as for example a fire retardant such as hexachlorophthalic anhydride, or a fire inhibitor, a bacteriostat, a fungicide, an insecticide, an ultraviolet light stabiliser or absorber, an anti-oxidant, a dye or a scent.

In addition, the particles of lignocellulosic material may be mixed with a suitable amount of cryogenically ground crumb rubber particles, such as those recovered from automobile tires, in the range of particle sizes from 0,25 mm to 3 mm, to improve the resilience, shock resistance, nail holding ability and flexibility of the finished product made therefrom.

Examples of the invention will now be given.

EXAMPLE 1

Into 200 kg of dichloromethane is first dissolved 4,5 kg of maleic anhydride and following that 4,5 kg of Suprasec 5005 MDI and 1 kg of gum rosin, to give an impregnation mixture.

60 kg of cotton stalk are milled, the pith removed and the fibres reduced to a mean length of from 2 to 8 mm.

A pre-mix is made up comprising of 3 kg dichloromethane, 1 kg of methyl alcohol, 4 gms of Culminal MHPC 20000S (Methylhydroxypropyl cellulose) by Hercules Corporation, and 150 gms of gum rosin. Into this is added 3 kg of irradiated polyethylene of a particle size of between 200 and 300 mesh and of a linear low density specification, irradiated by gamma irradiation at absorbed dosage of 16 kGy in oxygen at a typical dose rate of 1,3 Gy per second.

The 60 kg of cotton fibre is first impregnated by the impregnation mixture, the excess impregnation mixture is removed and returned to its storage tank, and into the dampened cotton fibre is introduced the pre-mix containing the irradiated polyethylene. Mixing in the mixer now commences and the adhesion promoters induce the polyethylene particles to adhere to the surface of the prepared and impregnated cotton fibres. Heat induction in the mixture is now commenced and the dichloromethane is recovered for reuse, and the dried beneficiated cotton fibres are ready for transportation to a press at another locality for pressing into a composite board.

EXAMPLE 2

Into 200 kg of dichloromethane is dissolved 10 kg of phthalic anhydride, to give an impregnating mixture.

60 kg of wood fibre is prepared by the removal of fines and is at a moisture percentage of 10%. The wood fibres are placed in a mixer, subjected to a vacuum, following which the mixing mechanism is commenced and the impregnating mixture is sprayed onto the wood fibres.

A mixture of 1,75 kg of novolac phenol formaldehyde resin with a hexamethylenetetramine cross linking agent and a particle size of between 200 and 300 mesh, with 3,5 kg of irradiated polyethylene which has been gamma irradiated at an absorbed dosage of 20 kGy in an oxygenated atmosphere, is now applied to the damp fibres in the mixer. The novolac resin is made sticky by the dichloromethane and serves as an adhesion promoter to adhere the irradiated polyethylene to the surface of the wood fibres.

Heat induction in the mixer is now commenced with the mixer still in motion and the dichloromethane is rapidly removed for recondensation and reuse.

The dried wood fibres are now mechanically applied to a flat surface in a mist spray of a pressure sensitive acrylic dispersion in water, i.e. Revertex AC396. As the lay up proceeds the water is removed by evaporation, the particles are gently pressed together and a flexible blanket results of a controlled thickness and weight per sq.m. Typically this blanket is 12 mm in thickness and weighs 2 kg/M$^2$. It is now placed between shaped platens of a press and pressed to a final thickness of 1,75 mm and density of 1,15 g/cm$^3$ for the roof lining of an automobile. In order to reduce the weight, exfoliated vermiculite at a density of 55 g/liter may be added to the lignocellulosic fibres during the resination process in order to drop the density to 0,5 g/cm$^3$.

The second aspect of the invention is a process of making an article from particles of a lignocellulosic material treated by steps (a), (b), (c) and (d) above, which process includes the step of compressing the particles of lignocellulosic material with heating in a suitable press or mould to allow the resin present to polymerise, and to allow any wax or convertible resin present to melt and to flow and all to set to form the article.

For example the particles of the lignocellulosic material may be compressed and heated in a suitable press or mould at temperatures between 120° C. and 250° C., preferably in the range of from 150° C. to 220° C., and at pressures of from 2 to 70 kg/cm$^2$, preferably about 15 to 45 kg/cm$^2$.

The third aspect of the invention is the process described above but for making a particle board from particles of a lignocellulosic material, which is modified by the inclusion in the particle board of one or more sheets of a lignocellulosic material impregnated with a particular composition. In this way, the impregnated sheet or sheets of lignocellulosic material are incorporated into one or both the outer horizons of the particle board thereby providing a stressed skin composite with a surface to which finishes can be applied.

The sheet or sheets of a lignocellulosic material may be sheets of paper, preferably kraft paper, pulp in sheet form, wood veneer, or sheets of any other suitable lignocellulosic material.

The sheet or sheets of lignocellulosic material are impregnated with a composition comprising a thermosetting resin, an extending liquid for the thermosetting resin, and where necessary a catalyst for the thermosetting resin.

Examples of suitable compositions for impregnation are disclosed in South African Patent No 90/2260 to Plascon Technologies (Proprietary) Limited and are set out in more detail below.

It is desirable that the thermosetting resin has an extended pot life. i.e. the period of time during which no significant viscosity change occurs in the resin mix. A pot life of at least fourteen to twenty five weeks is desirable. This may be achieved by suitable selection of thermosetting resin and the extending liquid and where present the catalyst. The thermosetting resin may also be kept at a low temperature, for example below 10° C. to extend the pot life.

The extending liquid has other important functions which are to provide variability as to the weight of resin to be impregnated into the sheets, to control resin viscosity, not to interfere with polymerisation, to be easily recovered from the impregnated material and to be easily handled without danger of toxicity, explosion or fire.

The thermosetting resin may be a phenolic resin (phenol formaldehyde resole resin), preferably a liquid phenolic resin, which can be polymerised at room or elevated temperatures. Examples of suitable phenolic resins include Celobond J 2027 L, J 2018, J 20/1096 L and J 20/1081 L from British Petroleum Company Plc, which may be catalysed with a catalyst such as Phencat 10 or more preferably latent catalyst Phencat P.R.P 382 from British Petroleum Plc. A phenol furfuryl resin catalysed with hexamethylenetetramine, or a blend of a phenolic resin with melamine formaldehyde or urea formaldehyde resins are also choices.

Suitable extending liquids for use with phenolic resins may be either solvents for the resin or low viscosity diluents, and may be either reactive or non reactive. Typical examples include water, C1 to C4 alcohols such as methanol or ethanol, higher carbon alcohols such as furfuryl alcohol, acetone or methyl ethyl ketone, or blends between them.

Other particularly suitable thermosetting resins are the MDI and TDI isocyanates which may be used without polyol or usual cross-linking components, because they link with the hydroxyl groups in the cellulose and hemicellulose of the lignocellulosic sheets of materials. An example of a suitable polyurethane pre-cursor of this type is Desmodur VK or Desmodur VKS by Bayer.

Suitable extending liquids for use with isocyanates are the halogenated hydrocarbons such as dichloromethane or trichloroethylene, or ethyl acetate. No catalyst is necessary.

Another type of thermosetting resin which may be used are the liquid room temperature curing acrylic and methacrylic acid esters and methyl methacrylates, typically catalysed with benzoyl peroxide powders. Further types are the urea formaldehydes, melamine formaldehyde resins, catalysed either with acids or alkalis, and which may have been internally plasticised with glycols.

The composition may also include other components such as an inhibitor, an accelerator or a surfactant, a fire retardant or a plasticiser.

There are two particularly preferred compositions for the use in this invention. These compositions are preferred because they have optimum pot life, they provide for suitable levels of impregnation of the resin into the sheet materials to be impregnated, they provide for easy polymerisation of the thermosetting resin once impregnated, and the extending liquid is easily recovered.

The first preferred liquid composition comprises a phenolic resin, 30% to 400% by weight of the phenolic resin of an extending liquid which is chosen from a C1 to C4 alcohol, preferably methanol, which imposes latency, but which may have blended with it another solvent to increase evaporative rate, and a catalyst for the phenolic resin such as Phencat 10 or a latent catalyst such as P.R.P 382 BY British Petroleum Plc or its equivalent.

The second preferred liquid composition comprises an isocyanate, preferably a MDI or TDI isocyanate, in which no catalyst inclusion is necessary, 20% to 350% by weight of the resin of an extending liquid which is selected from dichoromethane, trichloroethylene, ethyl acetate, methyl acetate or other suitable extending liquids, preferably dichloromethane, and an anhydride. The methyl or ethyl isocyanates esterify with the hydroxyl groups in the cellulose and hemi-cellulose molecules of the pulp or paper or wood veneer or other natural fibre or lignocellulosic material and in themselves form polyurea polymer structures imposing good mechanical properties on the material treated.

The sheets of lignocellulosic materials may be impregnated with the liquid composition in any suitable mariner. Immersion or impregnation by vacuum/pressure/vacuum impregnation in a suitable pressure cylinder or examples. Thereafter the impregnated sheets are passed to the next step of the process.

In the next step of the process, the extending liquid present in the impregnated sheets is recovered for re-use by evaporation and subsequent recondensation, or absorption.

In the next step of the process, the impregnated sheets of lignocellulosic material are positioned either at the bottom or top or on both bottom and top of a layer of the lignocellulosic particles to form a composite and the composite is then pressed under suitable conditions of temperature and pressure between the platens of a press, on either a continuous or discontinuous basis, whereupon the thermosetting resin in the impregnated sheets is polymerised, the resin in the lignocellulosic material polymerises, any wax or convertible resin present melts and flows and all set to form the particle board with the outer impregnated sheets firmly adhered to the core of the composite. These lend themselves to powder coating immediately the board exists the press and is at the requisite temperature.

After steps (a) to (d) of the methods described above, the particles of a lignocellulosic material so treated may be made up into a particle board or other article by compressing the particles of the lignocellulosic material with heating in a suitable press or mould. It has been found that the particles of a lignocellulosic material may be further treated before they are compressed in a press or mould, by wetting the particles of a lignocellulosic material with a solution of a natural latex or thermoplastic rubber or other tacky or sticky soluble compound, and then evaporating off the solvent, which may be water in the case of natural latex or an acrylic pressure sensitive adhesive.

The result of this is that the particles of the lignocellulosic material, either in the outer horizon or optionally throughout the depth thereof, are stuck together by the thermoplastic rubber or other tacky or sticky compound, to provide a flexible sheet. This flexible sheet may then be compressed with heating in a suitable press or mould as is described above.

The thermoplastic rubber may be any of those listed above, and the solvent may be any suitable solvent such as dichloromethane. Alternatively a natural latex in water may be used.

The solution of the thermoplastic rubber or other sticky or tacky compound may be applied to the particles of the lignocellulosic material by spraying. Thereafter the particles may be subjected to a moderate pressure, before or after removal of the solvent.

The advantage of the product produced by this step is that the flexible sheet may be placed in a press or mould which has a shaped surface, for example a corrugated or curved surface, without particle displacement which would result in undue thickness variations in the final product. When the flexible sheet is pressed at appropriate temperatures and pressures, it first conforms to shape of the press or mould, is then compressed and then the irreversible binding takes place to form a suitably shaped component. The resulting component is water resistant, has good mechanical properties, retains its shape, has no binder related toxic volatiles and is cost effective.

The fourth aspect of the invention is a process of making an article from particles of a lignocellulosic material treated by steps (a), (b), (c) and (d) above, by conventional extrusion or injection moulding techniques.

The treated particles of lignocellulosic material may also be combined with a suitable amount of an exfoliated vermiculite or with glass fibre or synthetic organic fibres, before manufacture of the finished product.

The various methods disclosed above and the products produced by these methods have various advantages which are set out below:

1 The chemical treatment of the particles for the composites consists of impregnation by a liquor in the solvent phase, allowing intimate contact of the treatment chemical and isocyanate resins where present with the hydroxyl groups in the lignocellulosic molecular make up rather than the surface spray on followed by "sheer or wet wipe" binder distribution associated with conventional technology, or chemical modification in the gaseous phase.

2 After the chemical treatment and resination of the particles, and the recovery of the solvent for re-use, the particles are in the latent condition allowing the pressing operation in making up the board to be carried out at a different place and at a different time. This allows for discontinuous production and results in the further advantage of minimising capital investment costs per unit of product produced, as well as greater marketing flexibility, i.e. selling the pre-manufactured board or the beneficiated lignocellulosic material only for board pressing by the customer.

3 The avoidance of binder related toxic volatiles, the minimisation of bulking on contact with water, the imposition of good mechanical properties and of good surface integrity are achieved.

4 Latency of the impregnating liquor is achieved, i.e. the chemical composition of the liquor ensures that there is no viscosity increase or "seeding" of the resin over time as a result of partial polymerisation or nucleation.

5 The entire composite is pressed from dry constituents which allows for a much wider choice of specification such as outer horizon make up, internal binder combinations and percentage levels, core constituent additives such as fibres or outer laminate choice, and product shape and forming method.

6 The levels of resin and modifiers impregnated are infinitely variable, surface wastage is avoided, and fibre modification is intimate as a function of the extending liquid percentage used, e.g. dichloromethane.

7 The water percentage of the lignocellulosic material used is not a factor, as the anhydride and also the isocyanate when present, act as water scavengers.

8 The particle size of the lignocellulosic material particles used may also be widely varied as a result of the way in which the resin particles adhere to the lignocellulosic material particles.

What I claim is:

1. A method of preparing particles of a lignocellulosic material for the manufacture of a finished product includes the steps of:
    (a) chemically modifying the lignocellulosic material by impregnating the lignocellulosic material with an impregnating composition comprising a dicarboxylic anhydride or a tricarboxylic anhydride dissolved in a suitable non-aqueous solvent;
    (b) applying to the particles an adhesion promoter to promote the adherence of a thermoplastic resin to the surfaces of the particles of lignocellulosic material;
    (c) applying to the particles a thermoplastic resin in dry powder form, so that after the application of the adhesion promoter, the thermoplastic resin adheres to the surfaces of the particles of lignocellulosic material, the thermoplastic resin having been surface modified by irradiation or by fluorination; and
    (d) after step (a) or step (c), removing the solvent.

2. A method according to claim 1 wherein the adhesion promoter is included in the impregnating composition of step (a).

3. A method according to claim 1 wherein the adhesion promoter is applied to the particles after step (a).

4. A method according to claim 2 or claim 3 wherein the solvent is recovered after step (c).

5. A method according to claim 1 wherein the solvent is recovered after step (a) and thereafter the adhesion promoter is applied to the particles of lignocellulosic material in a solvent for the adhesion promoter.

6. A method according to claim 1 wherein the adhesion promoter is applied to the particles of thermoplastic resin before step (c).

7. A method according to any one of claim 1 wherein the anhydride is selected from the group consisting of maleic anhydride, phthalic anhydride, succinic anhydride, tetrahydrophthalic anhydride and trimellitic anhydride.

8. A method according to any one of claim 1 wherein the solvent for the anhydride is selected from the group consisting of methyl acetate, ethyl acetate, methyl ethyl ketone, benzene, trichloroethylene and dichloromethane.

9. A method according to claim 8 wherein the solvent for the anhydride is dichloromethane.

10. A method according to any one of claim 1 wherein the impregnating composition contains from 0,25% to 25% inclusive of the anhydride by weight of the impregnating composition.

11. A method according to any one of claim 1 wherein the adhesion promoter is selected from the group consisting of petroleum resins, hydrocarbon resins, coumarone indene resins,
    thermoplastic rubbers, styrene butadiene resins, styrene acrylate resins, chlorinated rubbers, phenolic resins, solvent soluble thermoplastic resins, lignocellulosic derived gums or rosins, solvent swellable celluloses, phenol formaldehyde novolac resins, urethane elastomers, resinous tackifiers, bitumen, coal tar, asphalt, and pitch.

12. A method according to any one of claim 1 wherein the adhesion promoter is applied to the particles in an amount of from 0,1% to 25% inclusive of the adhesion promoter by weight of the particles of lignocellulosic material.

13. A method according to any one of claim 1 wherein the thermoplastic resin comprises an irradiated cross-linkable thermoplastic resin in dry powder form, which resin has been subjected to gamma irradiation whilst in dry powder form, the resin being selected from the group consisting of polyvinyl chloride, linear low density polyethylene, low density polyethylene and high density polyethylene.

14. A method according to any one of claim 1 wherein the thermoplastic resin comprises a thermoplastic resin in dry powder form which has been fluorinated, the resin being selected from the group consisting of polyvinyl chloride, polyethylene and polypropylene.

15. A method according to any one of claim 1 wherein in step (c) the particles of lignocellulosic material are resinated with from 1% to 300% inclusive of the thermoplastic resin by weight of the lignocellulosic material.

16. A method according to any one of claim 1 wherein in step (a) the impregnating composition includes an isocyanate thermosetting resin dissolved in a suitable compatible solvent.

17. A method according to claim 16 wherein the solvent for the isocyanate thermosetting resin is the same as the solvent for the impregnating composition.

18. A method according to claim 16 wherein the impregnating composition contains the isocyanate thermosetting resin in an amount of from 0,25% to 50% inclusive of the isocyanate thermosetting resin by weight of the impregnating composition.

19. A method according to any one of claim 1 wherein in step (c), there is also applied to the particles a dry powder novolac thermosetting resin and if necessary a catalyst therefor so that the dry powder novolac thermosetting resin adheres to the surfaces of the particles of lignocellulosic material.

20. A method according to any one of claim 1 wherein in step (c) there is also applied to the particles a wax either in dry particulate form or dissolved in a suitable solvent, so that the wax adheres to or impregnates the surfaces of the particles of lignocellulosic material.

21. A process of making a particle board from particles of a lignocellulosic material treated according to the method of any one of claim 1, which process includes the steps of:

(i) impregnating a sheet or sheets of a lignocellulosic material with a composition comprising a thermosetting resin, an extending liquid for the thermosetting resin and where necessary a catalyst for the thermosetting resin;

(ii) recovering the extending liquid;

(iii) placing on one or both sides of a layer of the particles of lignocellulosic material, the impregnated sheet or sheets of lignocellulosic material to form a composite; and (iv) compressing the composite with heating in a suitable press to allow the resin present to polymerise, and to allow any wax or convertible resin present to melt and flow, and to allow the thermosetting resin in the impregnated sheet or sheets to polymerise and to bond, and all to set to form the particle board.

22. A process according to claim 21 wherein in step (iv) the composite is compressed and heated in a suitable press at a temperature between 120° C. and 250° C. inclusive and at a pressure of from 2 to 70 kg/cm$^2$ inclusive.

* * * * *